April 9, 1935. C. P. HOWARD 1,997,365
VALVE DEVICE FOR BLEED OPENING
Filed March 4, 1931

Inventor
Clifton P. Howard
By Attorneys
Southgate Fays Hawley

Patented Apr. 9, 1935

1,997,365

UNITED STATES PATENT OFFICE 1,997,365

VALVE DEVICE FOR BLEED OPENING

Clifton P. Howard, Worcester, Mass., assignor to Rockwood Sprinkler Company of Massachusetts, a corporation of Massachusetts Application March 4, 1931, Serial No. 520,075

1 Claim. (Cl. 251—120)

This invention relates to a device to be used where a limited equalizing flow of air or other fluid is desired or otherwise stated, the invention relates to a device in which the valve is at all times open to a predetermined limited extent.

It is the object of my invention to provide a construction in which a constant valve opening of very slight cross section is obtained without recourse to the use of a bleed opening of minute diameter.

A further object of the invention is to provide a construction in which a secondary restriction of flow is provided. I also provide means by which greatly increased flow of air or other fluid in the reverse direction is permitted.

My invention further relates to arrangements and combinations of parts which will be hereinafter described and more particularly pointed out in the appended claim.

A preferred form of the invention is shown in the drawing, in which

Figure 1:
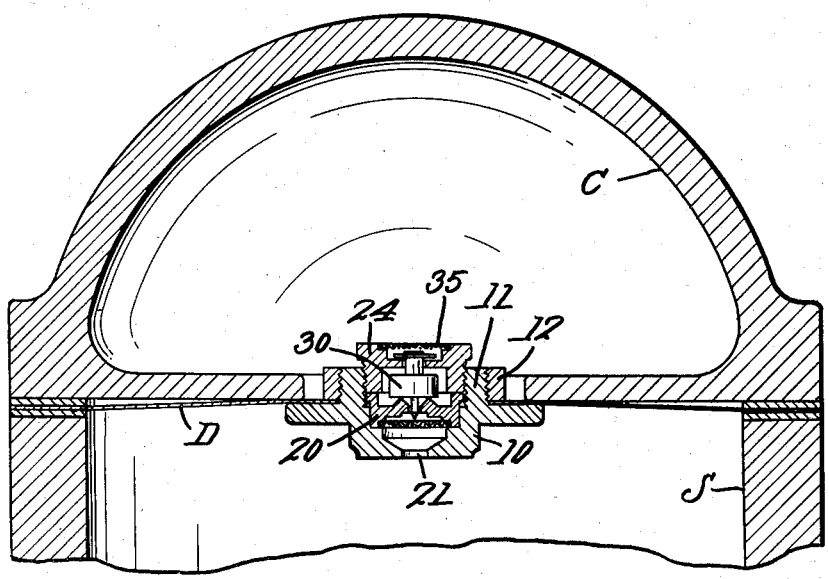
Fig. 1 is a sectional side elevation of my improved valve device.
Figure 3:
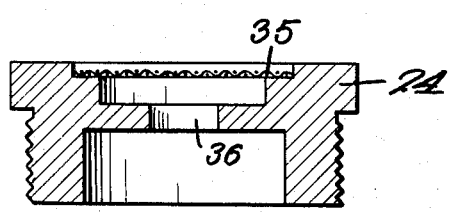
Fig. 3 is an enlarged sectional detail of the valve cap.
Figure 4:
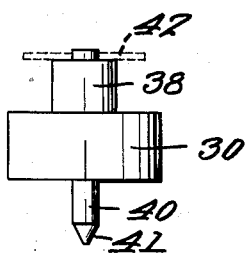
Fig. 4 is an enlarged side elevation of the valve.
Figure 2:
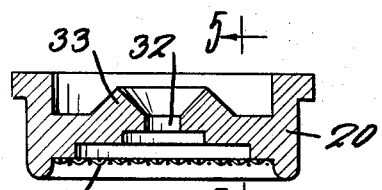
Fig. 2 is an enlarged sectional detail of the valve seat member.

Referring to the drawing, I have shown my improved valve device mounted in a central opening in a diaphragm D extending across the lower side of an air chamber C, such as the air chamber forming a component part of a dry pipe exhauster.

In the operation of such exhausters, the air chamber C, as well as the air space S below the diaphragm D, are filled with air at relatively high pressure. When a sprinkler opens in the dry pipe line, the air pressure in the space S falls, but the flow of air from the chamber C to the space S is retarded by the very small leakage opening between the chamber C and the space S, and consequently an excess of air pressure is developed above the diaphragm D, causing the diaphragm to be depressed, which action indirectly effects the opening of the exhaust valve.

My invention relates specifically to improvements in the construction of the valve device shown as regulating the flow of air or leakage between the chamber C and the space S, but it will be understood that the device is adapted for general purposes and may be used wherever a restricted flow of air or other fluid is desired.

My improved valve device comprises a casing 10 having a sleeve portion 11 threaded both internally and externally and extending upward through a central opening in the diaphragm D. A collar or nut 12 threaded on the outside of the sleeve 11 clamps the casing 10 firmly against the diaphragm D.

The casing 10 is recessed to receive a valve seat member 20 and is provided with an air passage 21 in its lower portion. A cap 24 is threaded into the sleeve 11 and firmly secures the valve seat member 20 in position.

A valve 30 is loosely mounted between the valve seat member 20 and the cap 24 and is capable of limited upward movement between these retaining parts.

The valve seat member 20 has a central opening 32, surrounded by a valve seat 33 which is preferably substantially V-shaped in cross section. The lower portion of the valve seat member 20 is recessed to receive a screen 34 to prevent dirt or other foreign matter from entering the opening 32. The upper portion of the cap 24 is similarly recessed to receive a second screen 35 provided for the same purpose.

The cap 24 has a central opening 36 loosely surrounding the stem 38 of the valve 30. A stud or projection 40 extends downward from the valve 30 and the lower portion of the stud 40 is downwardly and outwardly tapered as indicated at 41.

A disc 42 may be provided at the upper end of the valve stem 38 to prevent displacement of the valve member 30 from the cap 24 when the cap 24 is removed.

When the parts are assembled and in normal position, the valve 30 rests on the V-shaped valve seat 33, and the cylindrical downwardly projecting portion 40 of the valve 30 extends into the opening 32 of the valve seat member 20. The stud 40 is smaller than the opening 32, so that an annular space of the desired restricted cross section is provided between the stud and the side wall of the opening 32.

The space between the valve stem 38 and the side wall of the opening 36 in the cap 24 is substantially greater than the opening between the stud 40 and the side wall of the opening 32, the stem 38 being used merely for guidance and not for restriction of air flow.

Figure 5:
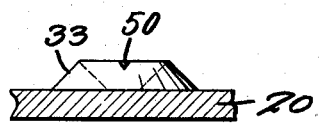
Fig. 5 is a sectional view of the valve seat, taken along the line 5—5 in Fig. 2 but showing a slight modification.

The flow of air is also still further restricted by the seating of the valve 30 on the valve seat 32. It is found that when these parts are machined but not lapped, they will seat unevenly and will permit the desired amount of leakage between the valve and its seat, thus providing a secondary restriction of air flow. If more definite leakage between the valve and the valve seat is desired, a notch 50 (Fig. 5) may be cut at one or more points in the valve seat 33.

It will thus appear that I have secured an air leakage of a desired restriction without the use of minute perforations, which are readily clogged by small particles of dust or dirt.

When the chamber C is being filled and the pressure in the space S exceeds the pressure in the chamber C, pressure of air against the under side of the valve 30 will lift the valve from its seat, thus moving the tapered portion 41 of the stud 40 into the opening 32 and providing an annular opening of increased area so that the chamber C may be quickly filled. The fact that the valve 30 and stud 40 are movable relative to the valve seat 33 and opening 32 greatly reduces the probability of clogging the bleed opening, as any lifting of the valve tends to clear the opening 32 of any dust or dirt which might be accumulating in or around the opening.

Having thus described my invention and the advantages thereof, I do not wish to be limited to the details herein disclosed, otherwise than as set forth in the claim, but what I claim is:—

A valve device for a bleed opening comprising a support having a valve seat with a relatively small circular central opening therethrough and a member seated thereon by gravity and having a stud slidable in said circular opening and thereby providing a restricted annular leakage space of predetermined and very small cross sectional area, the difference in diameter between said stud and said circular opening being approximately two thousandths of an inch and the total cross sectional area of said opening being approximately two ten-thousandths of a square inch, said difference in diameter and said total cross sectional area being so extremely small that air flow through said annular leakage space is very greatly retarded and is extremely slow, said member opening upward on excess of air pressure below said device, and the air above said device having continuous access to the restricted annular space between the wall of said opening and said stud.

CLIFTON P. HOWARD.